United States Patent
Owens et al.

[11] Patent Number: 5,965,095
[45] Date of Patent: Oct. 12, 1999

[54] FLUE GAS HUMIDIFICATION AND ALKALINE SORBENT INJECTION FOR IMPROVING VAPOR PHASE SELENIUM REMOVAL EFFICIENCY ACROSS WET FLUE GAS DESULFURIZATION SYSTEMS

[75] Inventors: David R. Owens, Mountain View, Calif.; Oliver W. Hargrove, Jr., Austin, Tex.; Joseph R. Peterson, San Antonio, Tex.; David M. Seeger, Round Rock, Tex.; Ron C. Skarupa, Lockport, N.Y.; Miriam Stohs, Golden, Colo.

[73] Assignee: Electric Power Research Inst., Palo Alto, Calif.

[21] Appl. No.: 08/851,091

[22] Filed: May 5, 1997

[51] Int. Cl.⁶ .................................... B01D 53/46
[52] U.S. Cl. .............. 423/210; 423/215.5; 423/242.1; 423/243.01; 423/508
[58] Field of Search ................... 423/508, 509, 423/510, 242.1, 215.5, 210, 243.01

[56] References Cited

U.S. PATENT DOCUMENTS

| | | | |
|---|---|---|---|
| 3,130,012 | 4/1964 | Prater et al. | 23/209 |
| 3,966,889 | 6/1976 | Kakuta et al. | 423/510 |
| 4,273,747 | 6/1981 | Rasmussen | 423/210 |
| 4,956,162 | 9/1990 | Smith et al. | 423/244 |
| 5,192,514 | 3/1993 | Dismukes | 423/210 |
| 5,246,677 | 9/1993 | Moser et al. | 423/243.08 |
| 5,246,679 | 9/1993 | Moser et al. | 423/243.09 |
| 5,260,045 | 11/1993 | Moser et al. | 423/243.09 |
| 5,281,402 | 1/1994 | Gohara et al. | 423/210 |
| 5,340,547 | 8/1994 | Moser et al. | 422/177 |
| 5,368,617 | 11/1994 | Kindaig | 44/622 |
| 5,435,980 | 7/1995 | Felsvang et al. | 423/210 |

FOREIGN PATENT DOCUMENTS 1107626  3/1968  United Kingdom .............. 423/243.01

OTHER PUBLICATIONS

Schulek et al. "Contributions to the Chemistry of Selenium . . . " *J. Inorg. Nucl. Chem.* vol. 13, pp. 58–63, 1960 No month. Pergamon Press Ltd. Printed in Northern Ireland.

Karsten Felsvang et al., Air Toxics Control By Spray Dryer Absorption, $SO_2$ Control Symposium, vol. 2, Sessions 5A, 5B, 6A and 6B, EPRI Publication TR–103289–V2, Aug. 1993, pp. 1–15.

*Primary Examiner*—Gary P. Straub
*Assistant Examiner*—Timothy C Vanoy
*Attorney, Agent, or Firm*—Sixbey, Friedman, Leedom & Ferguson; Donald R. Studebaker

[57] ABSTRACT

A process is provided for removing vapor phase selenium species produced by the combustion of selenium and sulfur-containing fuel of the kind used to generate electric power in conjunction with a flue gas desulfurization process. In one process embodiment the flue gas leaving the combustion system is humidified by the injection of atomized water or a dilute alkaline slurry at a selected location upstream of the flue gas desulfurization system to cool the flue gas from a temperature of about 300° F. to a temperature of about 280° F. so as to enhance the selenium removal efficiency. In another process embodiment the flue gas leaving the combustion system is first humidified to cool the flue gas from a temperature of about 300° F. to a temperature of about 200° F. so as to enhance the selenium removal efficiency, and then an alkaline sorbent material is injected into the humidified flue gas. Selenium species are removed from the flue gas with the particulates in a particulate control device between the combustion system and the flue gas desulfurization system.

21 Claims, 1 Drawing Sheet

FLUE GAS HUMIDIFICATION AND ALKALINE SORBENT INJECTION FOR IMPROVING VAPOR PHASE SELENIUM REMOVAL EFFICIENCY ACROSS WET FLUE GAS DESULFURIZATION SYSTEMS

TECHNICAL FIELD

The present invention relates generally to the removal of toxic metals from flue gas subjected to wet flue gas desulfurization systems and particularly to a process for improving the removal of vapor phase selenium species across a wet flue gas desulfurization system.

BACKGROUND OF THE INVENTION

Selenium is one of the potentially toxic trace metals found in the coal and lignite customarily used as energy sources for electric power plants. The combustion of selenium-containing coal or lignite typically produces selenium oxide ($SeO_2$) in the flue gas, although there is some disagreement on this point. Selenium may predominate as the free element ($Se_6$) in flue gas at flue gas temperatures around 150° C. (302° F.). Whether it is present as the oxide or the free element, the removal of selenium from flue gas prior to the discharge with the stack gases produced by the power generation process is highly desirable.

Virtually all of the selenium from the combusted coal or lignite is found in some form in the combustion waste gas. Typically, electric power plant waste gases are subjected to one or more treatments to remove particulates and controlled components such as sulfur oxides and nitrogen oxides. Particulates may be removed by electrostatic precipitators, baghouses and scrubbers designed to remove solid particles from gaseous media. After particulates are removed, the flue gas is generally directed to a flue gas desulfurization system where sulfur and nitrogen oxides are removed from the flue gas so that it meets standards for the discharge of stack gases to the environment. If selenium is not removed from the flue gas prior to the scrubbing of the gas in the flue gas desulfurization process, separation of the selenium from the flue gas desulfurization solids will be required after scrubbing, which can be difficult and costly.

U.S. Pat. No. 5,192,514 to Dismukes, which is commonly owned by the assignee of the present invention, discloses a method for the removal of gaseous selenium from flue gas. This method does not humidify the flue gas, but involves injecting ammonia into flue gas produced by coal combustion at a location between an air heater and a baghouse, although it is disclosed that the ammonia may also be added to the flue gas stream in the baghouse. However, ammonia is expensive and can be somewhat dangerous to handle.

U.S. Pat. No. 3,966,889 to Kakuta et al. describes a wet scrubbing process for removing selenium from waste gas, especially that produced by a glass melting furnace. The waste gas is contacted with an absorbing solution containing an alkali metal sulfite or bisulfite. An acid treatment reduces the selenium present in solution to metallic selenium. However, in this process, the waste gas is contacted with an excess of a water-based reagent and is thus closer to a wet flue gas desulfurization process scrubbing step. In the process described in this patent, selenium removal occurs simultaneously with the sulfur dioxide removal and, thus, does not avoid the problems which accompany high selenium concentrations in the liquid streams exiting the flue gas desulfurization system.

U.S. Pat. No. 5,281,402 to Gohara et al. discloses a method of saturating and humidifying flue gas in a flue gas desulfurization process to removal gaseous contaminants such as mercury. However, this is essentially a scrubbing process which uses recycled slurry to form a continuous liquid curtain through which the flue gas is passed. As a result, sulfur oxides would be removed with the contaminants, and it would be necessary to separate the contaminants from the sulfur oxide-containing scrubbing byproducts.

U.S. Pat. No. 3,130,012 to Prater et al. discloses a process for the recovery of selenium from the gaseous effluents produced by copper smelting. In this process an anionic surface active agent in an aqueous solution is used in conjunction with a selenium coagulant to remove and recover selenium values. It is not suggested that humidification of the flue gas in conjunction with the injection of alkaline materials could be employed to remove substantially all of the vapor phase selenium from a flue gas to be subjected to a flue gas desulfurization process.

In U.S. Pat. No. 4,273,747, Rasmussen discloses the removal of mercury from waste gases produced by the incineration of domestic waste. An aqueous liquid, which may be hydrated lime, is atomized into the waste gas stream, which is stated to have a temperature of at least 200° C., in a quantity higher than required to cool the waste gas stream to a temperature of 160° C., but lower than the temperature required to cause complete water evaporation. The mercury is separated out in the fly ash, which is recovered as a free-flowing powder. It is not suggested that this method could be used to effect selenium removal from selenium and sulfur oxides-containing flue gas produced by the combustion of coal. Moreover, the temperature of the flue gases produced by coal combustion is typically well below the 200° C. temperature required by the Rasmussen process.

U.S. Pat. No. 5,435,980 to Felsvang et al. and the paper entitled "Air Toxics Control By Spray Dryer Absorption" by Felsvang et al. describe the removal of mercury vapor in dry flue gas desulfurization systems. In the method of U.S. Pat. No. 5,435,980, an aqueous suspension of a basic absorbent is atomized into hot flue gas in a drying chamber of a drying absorption zone. The chloride content of the flue gas or absorbent is adjusted to achieve high mercury removal. In the "Air Toxics Control" publication, mercury is removed by an activated carbon injection system upstream of a spray dryer absorber. Chlorine is added as required to enhance mercury removal when the chloride content of the coal is low. The "Air Toxics Control" publication suggests that other air toxics, including selenium and boron, could also be removed in a dry flue gas desulfurization system. However, these references do not suggest that the removal of vapor phase selenium across a wet flue gas desulfurization process could be achieved by humidification of the flue gas in conjunction with the injection of an alkaline material upstream of the scrubber in a flue gas desulfurization system.

The prior art, therefore, has failed to provide an effective method for efficiently and effectively removing substantially all of the vapor phase selenium from selenium and sulfur oxide-containing flue gas produced by a coal burning power generating plant across a wet flue gas desulfurization system. A need exists for such a method.

SUMMARY OF THE INVENTION

It is a primary object of the present invention, therefore, to overcome the disadvantages of the prior art and to provide a process for improving vapor phase selenium removal from selenium and sulfur oxide-containing flue gas from a coal burning power generating plant across a wet flue gas desulfurization system.

It is a further object of the present invention to provide a process for efficiently removing vapor phase selenium from selenium and sulfur oxide-containing flue gas upstream of a wet flue gas desulfurization system.

It is another object of the present invention to provide a process for efficiently removing selenium from the flue gas of a coal burning power plant which avoids corrosion of flue gas desulfurization system ductwork and equipment.

It is yet a further object of the present invention to provide a method for efficiently removing selenium from selenium and sulfur oxide-containing flue gases prior to scrubbing the sulfur oxides from the gas.

It is yet another object of the present invention to provide a process for removing vapor phase selenium from flue gas produced by a coal burning power plant which converts vapor phase selenium species to solid salts.

In accordance with the aforesaid objects, a process for efficiently and effectively removing vapor phase selenium species from selenium and sulfur oxides-containing flue gas produced by the combustion of selenium and sulfur-containing fuel in an electricity generating power plant in conjunction with a flue gas desulfurization process is provided. The flue gas is humidified upstream of a flue gas desulfurization system by atomizing water or a dilute alkaline slurry into the flue gas to cool the flue gas desulfurization inlet flue gas temperature from about 300° F. (141° C.) to about 200° F. to 280° F. (90° C. to 131° C.). The water or alkali can also be atomized into the flue gas upstream of a particulate control apparatus typically used to remove particulates from flue gas prior to scrubbing. Alternatively, alkaline material may be injected into the flue gas upstream of the particulate control apparatus in conjunction with humidification of the flue gas to convert vapor phase selenium to solid selenium salts that can be removed from the flue gas in the particulate control apparatus.

Other objects and advantages will be apparent from the following description, claims and drawings.

DETAILED DESCRIPTION OF THE PREFERRED EMBODIMENTS

During the combustion of coal in utility boilers, vapor phase and solid phase selenium species are generated. The total amount of selenium generated depends on the selenium content of the coal. The selenium species exit the boiler with the exhaust or flue gas, which also contains the sulfur oxides removed by a flue gas desulfurization process. Typically, the solid phase selenium species are removed from the flue gas along with fly ash by various available particulate control technologies, such as fabric filters or electrostatic precipitators. The vapor phase selenium species are not usually removed by particulate control devices, but are discharged into the atmosphere with the stack gases. Some vapor phase selenium species may be fractionally removed by the flue gas desulfurization process with the sulfur dioxide. However, most utility boilers are not equipped with such sulfur dioxide control systems.

The vapor phase selenium removal process of the present invention efficiently removes vapor phase selenium species from flue gas produced by the combustion of selenium and sulfur-containing fuel, such as coal or lignite, in a power generating plant. This may be accomplished by treating the flue gas after it exits the boiler or main combustion vessel and before the flue gas is subjected to a flue gas desulfurization process. When flue gas is humidified upstream of a flue gas desulfurization system, the vapor phase selenium removal efficiency across the system is increased. Selenium removal efficiency may be further enhanced by injecting an alkaline sorbent material into the flue gas in conjunction with humidifying the flue gas.

Figure 1:
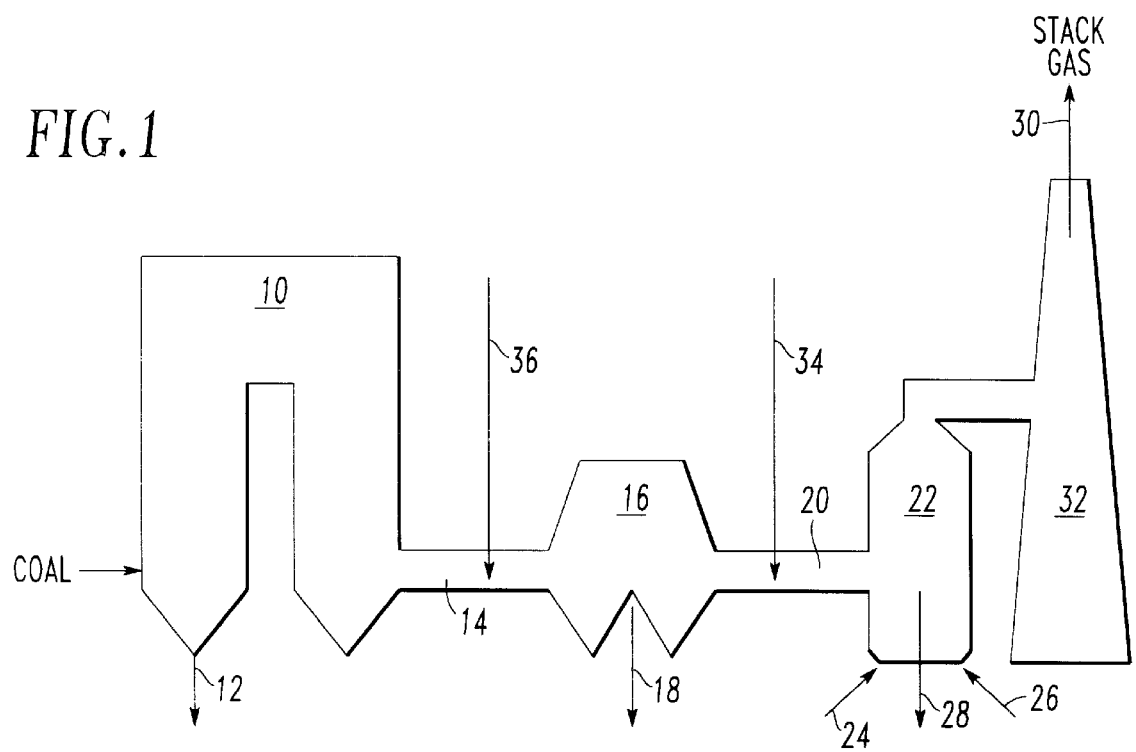
FIG. 1 is a simplified process flow diagram illustrating humidification of the flue gas from a coal power plant for vapor phase selenium control in accordance with one embodiment of the present invention.

The optimal amount of humidification for enhancing the removal of vapor phase selenium species is just enough to lower the temperature of the flue gas from its normal flue gas desulfurization system inlet value of about 300° F. (141° C.) to approximately 200° to 280° F. (90° to 131° C.). FIG. 1 illustrates, schematically, the humidification of flue gas from a coal power plant. In the diagram shown in FIG. 1, coal is combusted in a boiler 10. Bottom ash is removed from the boiler at 12, and high dust flue gas is directed from the boiler at 14 to an electrostatic precipitator 16 or a similar particulates removal device. Particulate material is collected at 18. The outlet gas from the electrostatic precipitator or other particulate control device is directed at 20 to a flue gas desulfurization system 22. Limestone 24 and makeup water 26 are added to the flue gas desulfurization system 22. The flue gas desulfurization process conducted by the flue gas desulfurization system 22 produces flue gas desulfurization solids 28 and stack gases 30, which are discharged to the atmosphere through a stack 32.

The present invention may be used in conjunction with a number of different flue gas desulfurization processes, such as, for example, those described in U.S. Pat. Nos. 5,246,677; 5,246,679; 5,260,045; and 5,340,547, all of which are owned by the assignee of the present invention. However, flue gas desulfurization processes such as these are not designed to enhance the removal of vapor phase selenium species.

Vapor phase selenium removal is enhanced in the system shown in FIG. 1 by atomizing water or, alternatively, a dilute alkaline slurry into the flue gas at two possible locations, either upstream of the flue gas desulfurization process at 34 or upstream of a particulate control device located upstream of the flue gas desulfurization process at 36. Atomization may be accomplished using conventional fluid atomizing devices, such as two-fluid spray nozzles or rotary atomizers. Humidification of the flue gas cools the flue gas desulfurization process inlet flue gas temperature to about 200° to 280° F. (90° to 131° C.) and, as described below, can improve selenium removal efficiency across the flue gas desulfurization system from less than 50% selenium removal to about 75% selenium removal. Example 1 describes tests conducted to demonstrate the improved selenium removal efficiency achieved by humidification of flue gas from a coal boiler as shown and described in connection with FIG. 1.

EXAMPLE 1

For these studies, water was atomized and injected into the flue gas as an atomized spray at location 36 in FIG. 1, which is upstream of the particulate control device 16.

Flue gas was extracted from the outlet duct on the boiler at a coal burning utility plant and routed through a spray dryer vessel at the assignee's, Electric Power Research Institute's, Environmental Control Technology Center in Barker, N.Y. The water injection occurred in the spray dryer vessel. The amount of atomized water injected to humidify the flue gas should increase the humidity of the flue gas and should be sufficient to cool the flue gas desulfurization inlet gas temperature from its normal temperature of about 300° F. (141° C.) to about 200° to 280° F. (90° to 131° C.). The injected completely evaporates and cools the flue gas, but does not saturate the flue gas. This avoids the corrosion of the ductwork or equipment which can occur if the flue gas is water saturated or supersaturated. The humidified flue gas was then passed through a five field electrostatic precipitator for fly ash removal. After removal of the fly ash in the electrostatic precipitator, the flue gas was treated with a pilot scale wet flue gas desulfurization system and was returned to the utility plant ductwork.

The flue gas flow rate and temperature at the outlet of the spray dryer vessel were controlled to their desired setpoints using a variable speed fan and an electric heater. The flue gas sulfur dioxide ($SO_2$) and oxygen ($O_2$) concentrations were continuously measured at the spray dryer inlet, the spray dryer outlet, and the outlet of the electrostatic precipitator to measure any sulfur dioxide removal and to correct the selenium removal data for air inleakage into the system.

Each field of the electrostatic precipitator contained five gas passages. The collecting plates were 12 feet long with a 12 inch spacing between the plates. The corona wires were 3/16 inch in diameter and mounted in a rigid configuration. The power supplies were rated at 65 kV and 200 mA. Only the last two fields of the electrostatic precipitator were energized, which produced a specific collection area of about 225 $ft^2$/kacfm.

The vapor phase selenium concentrations in the flue gas were determined by EPA Method 29. The process inlet and outlet flue gas streams were sampled simultaneously for about 90 minutes. The EPA Method 29 peroxide impingers were analyzed for selenium concentration using graphite furnace atomic absorption. The vapor phase selenium concentrations in the flue gas streams were calculated from the impinger selenium concentration and the amount of gas sampled.

Table I presents the results of these studies.

TABLE I

| Test ID | Humidification | Inlet Selenium Concentration ($Mg/Nm^3$) | Selenium Removal Efficiency (%) |
| --- | --- | --- | --- |
| PTP-1 | No | 34 | 53 |
|  | No | 27 | 50 |
|  | No | 33 | 50 |
|  | No | 31 | 41 |
|  |  |  | Average: 48 |
| PTP-7 | Yes | 24 | 71 |
|  | Yes | 23 | 72 |
|  | Yes | 30 | 76 |
|  | Yes | 32 | 82 |
|  |  |  | Average: 75 |
| PTP-12/13 | No | 47 | 42 |
|  | No | 47 | 40 |
|  | No | 46 | 51 |
|  | No | 53 | 56 |
|  |  |  | Average: 47 |

The data in Table I show that the selenium removal efficiency across the flue gas desulfurization system improved from less than 50% without flue gas humidification to about 75% with flue gas humidification.

The removal of vapor phase selenium species from flue gas can be enhanced by the injection of alkaline sorbent materials into the flue gas in conjunction with humidification of the flue gas. Alkaline sorbent materials, preferably hydrated lime, and water are injected into the flue gas, which causes the vapor phase selenium species to react with the alkali to form solid selenium salts. These selenium salt solids are removed from the flue gas by the particulate control device. The alkaline sorbent material is injected at a rate high enough to remove the desired amount of vapor phase selenium and to ensure that the collected particulate is alkaline to avoid corrosion of the ductwork and other equipment.

Figure 2:
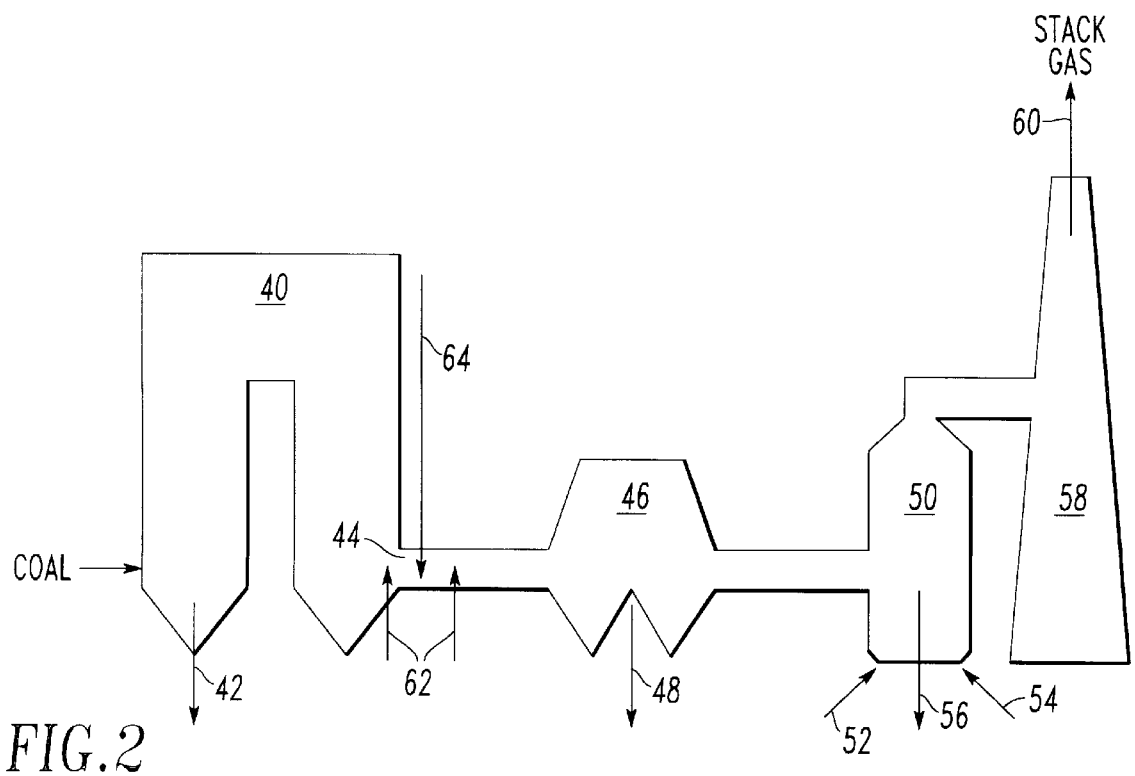
FIG. 2 is a simplified process flow diagram illustrating alkaline sorbent injection in connection with humidification of the flue gas from a coal power plant for vapor phase selenium control in accordance with a second embodiment of the present invention.

FIG. 2 illustrates a process flow diagram for a vapor phase selenium control system in accordance with a second embodiment of the present invention. Like the FIG. 1 embodiment, coal is combusted in a boiler 40 in a power generating plant. The bottom ash is drawn off at 42, and flue gas is directed from the boiler at 44 to a particulate control device 46, which may be an electrostatic precipitator or other particulate removal apparatus. The collected particulate 48 is removed from the flue gas, and the flue gas is directed to a flue gas desulfurization system 50. Limestone 52 and makeup water 54 are added to the system to scrub sulfur oxides from the flue gas, and flue gas desulfurization solids 56 are removed from the system. The scrubbed flue gas is directed to a stack 58, where the scrubbed flue gas is discharged to the environment as stack gas 60.

Removal of the vapor phase selenium species is enhanced by the injection of an alkaline sorbent material at 62 in conjunction with humidification of the flue gas at 64 by the injection of an atomized spray of water or a dilute alkali solution to reduce the temperature of the flue gas as described above. It is believed that the humidification process provides a thin layer of water on the injected alkaline solids to make them reactive with the vapor phase selenium species. Tests showed that the injection of hydrated lime as the alkaline material without humidification did not remove vapor phase selenium. However, the injection of a water based hydrated lime slurry removed essentially all of the vapor phase selenium from the flue gas. The selenium vapors are acidic, and the alkaline materials not only react readily with these vapors, but lower the potential for corrosion and reduce the impact of flue gas humidification on the downstream electrostatic precipitator. Example 2 describes tests conducted to demonstrate the improved selenium efficiency achieved by the injection of alkaline materials in conjunction with the humidification of flue gas from a coal boiler as shown and described in connection with FIG. 2.

EXAMPLE 2

Flue gas was extracted from the outlet duct on a boiler at a coal burning utility plant and routed through a spray dryer vessel where alkali and water injection occurred. The alkali used was slaked lime. As in Example 1 above, the flue gas was passed through a five field electrostatic precipitator, treated with a flue gas desulfurization system and returned to the utility ductwork.

The flue gas flow rate and temperature were controlled, flue gas $SO_2$ and $O_2$ concentrations were measured, and vapor phase selenium concentrations were determined as described in Example 1. The results of the studies conducted are presented in Table II.

TABLE II

| Test Series ID | Lime Slurry Injection Rate | Inlet Se Vapor Conc. ($\mu g/Nm^3$) | Outlet Se Vapor Conc. ($\mu g/Nm^3$) | Removal Efficiency (%) |
|---|---|---|---|---|
| PTP-7 | Water Only* | — | 27 | 0 |
| PTP-6A | Low | 38** | 5 | 87 |
| PTP-6B | Medium | 38** | 1 | 97 |
| PTP-8 | High | 54 | 7 | 88 |
| PTP-8 | High | 67 | 6 | 92 |
| PTP-8 | High | 38** | 0.5 | 99 |

*Flue gas was humidified, but no alkali was injected.
**Reported value is an average of values obtained during other tests.

This data shows that the injection of slaked lime slurry upstream of an electrostatic precipitator produced very high vapor phase selenium removal efficiencies.

Industrial Applicability

The vapor phase selenium removal process of the present invention has particular application to the processing of flue gas produced by the combustion of sulfur and selenium-containing fuels, especially coal and lignite, in a power generating plant. This method may also be employed to remove vapor phase selenium species from a hot, high dust gas prior to treatment by a particulate control or removal apparatus.

We claim:

1. A process for removing vapor phase selenium species from flue gas produced by the combustion of a sulfur and selenium-containing fuel in conjunction with a flue gas desulfurization process, wherein said process includes the steps of:
   (a) directing a vapor phase selenium and sulfur oxides-containing flue gas at a first temperature and humidity produced by the combustion apparatus first to a particulate control apparatus and then to a flue gas desulfurization system;
   (b) humidifying said flue gas at a selected location between said combustion apparatus and said flue gas desulfurization system to decrease the temperature of the flue gas to a value below said first temperature and to increase the humidity of the flue gas to a value above said first humidity and to change the vapor phase selenium species to a form that facilitates removal of the selenium species from the flue gas, wherein said temperature is decreased to about 200 to 280° F.; and
   (c) removing the removable selenium species from the flue gas.

2. The process described in claim 1, wherein said flue gas is humidified by the injection of atomized water into the flue gas.

3. The process described in claim 1, wherein said flue gas is humidified by spraying a dilute alkaline slurry into the flue gas.

4. The process described in claim 1, wherein the flue gas is humidified downstream of the combustion apparatus and upstream of the particulate control apparatus.

5. The process described in claim 1, wherein the flue gas is humidified downstream of the particulate control apparatus and upstream of the flue gas desulfurization apparatus.

6. The process described in claim 1, wherein said first temperature is about 300° F.

7. The process described in claim 6, wherein said flue gas is humidified by the injection of an atomized spray of water or a dilute alkaline slurry upstream of said particulate control apparatus and said selenium is removed with particulate from the particulate control apparatus.

8. The process described in claim 7, wherein said particulate control apparatus is an electrostatic precipitator.

9. The process described in claim 1, wherein said flue gas is humidified upstream of said particulate control apparatus and said process further includes the step of injecting an alkaline material into said flue gas upstream of said particulate control apparatus after said flue gas has been humidified.

10. A process for removing vapor phase selenium species from flue gas produced by the combustion of a sulfur and selenium-containing fuel in conjunction with a flue gas desulfurization process to produce substantially selenium-free gas for discharge to the atmosphere, wherein said process includes the steps of:
   (a) directing a vapor phase selenium and sulfur oxides-containing flue gas at a first temperature and humidity produced by the combustion of said fuel from a combustion apparatus first to a particulate control apparatus and then to a flue gas desulfurization system;
   (b) humidifying said flue gas leaving said combustion apparatus to increase the humidity of the flue gas to a value above the first humidity and to decrease the temperature of the flue gas to a value below the first temperature, wherein said value below said first temperature is in the range of about 200° to about 280° F.
   (c) injecting an alkaline sorbent material into the humidified flue gas to form solid selenium salts from said vapor phase selenium species in said humidified flue gas; and
   (d) removing said solid selenium salts from said flue gas in said particulate control apparatus to produce flue gas for discharge to the atmosphere that is substantially free of vapor phase selenium species.

11. The process described in claim 10, wherein said process further includes the step of treating the flue gas produced in step (d) to remove the sulfur oxides, thereby producing gas for discharge to the atmosphere that is substantially free of selenium and sulfur oxides.

12. The process described in claim 10, wherein said flue gas is humidified by the injection of atomized water into said flue gas.

13. The process described in claim 12, wherein said alkaline sorbent material is lime.

14. The process described in claim 10, wherein said first temperature is about 300° F.

15. The process described in claim 10, wherein said particle control apparatus is an electrostatic precipitator.

16. The process described in claim 10, wherein said flue gas is humidified by the injection of atomized water into said flue gas, said alkaline material is lime, and said first temperature is about 300° F.

17. The process described in claim 16, wherein said particulate control apparatus is an electrostatic precipitator and said solid selenium salts are removed from said flue gas by said electrostatic precipitator.

18. The process described in claim 10, wherein said flue gas is humidified and alkaline material is injected into said flue gas downstream of said combustion apparatus and upstream of said particulate control device.

19. A process for removing vapor phase selenium species from flue gas produced by the combustion of a selenium-containing fuel to produce substantially selenium-free gas for discharge to the atmosphere, wherein said process includes the steps of:
   (a) directing a vapor phase selenium-containing flue gas at a first temperature and humidity produced by the combustion of said fuel from a combustion apparatus to a particulate control apparatus;

(b) humidifying said flue gas leaving said combustion apparatus to increase the humidity of the flue gas to a value above the first humidity and to decrease the temperature of the flue gas to a value below the first temperature, wherein said value below said first temperature is in the range of about 200° to about 280° F.;

(c) injecting an alkaline sorbent material into the humidified flue gas to form solid selenium salts from said vapor phase selenium species in said humidified flue gas; and (d) removing said solid selenium salts from said flue gas in said particulate control apparatus to produce flue gas for discharge to the atmosphere that is substantially free of vapor phase selenium species.

20. The process described in claim 19, wherein said flue gas is humidified by the injection of atomized water into said flue gas, said alkaline sorbent material is lime, and said first temperature is about 300° F.

21. The process as described in claim 1, wherein said flue gas desulfurization system is a wet flue gas desulfurization system.

* * * * *